United States Patent
Michaloski et al.

(10) Patent No.: US 6,191,887 B1
(45) Date of Patent: Feb. 20, 2001

(54) LASER ILLUMINATION WITH SPECKLE REDUCTION

(75) Inventors: Paul F. Michaloski; Bryan D. Stone, both of Rochester, NY (US)

(73) Assignee: Tropel Corporation, Fairport, NY (US)

( * ) Notice: Under 35 U.S.C. 154(b), the term of this patent shall be extended for 0 days.

(21) Appl. No.: 09/479,418

(22) Filed: Jan. 7, 2000

Related U.S. Application Data

(60) Provisional application No. 60/116,482, filed on Jan. 20, 1999.

(51) Int. Cl.[7] ..................................... G02B 5/30
(52) U.S. Cl. ................. 359/495; 359/496; 372/9; 372/26; 372/98
(58) Field of Search ........................... 359/495, 496; 372/9, 26, 98

(56) References Cited

U.S. PATENT DOCUMENTS

| | | | |
|---|---|---|---|
| 3,633,999 | * 1/1972 | Buckles | 359/577 |
| 3,941,456 | 3/1976 | Schilz et al. | 350/161 |
| 4,035,068 | 7/1977 | Rawson | 353/122 |
| 4,155,630 | 5/1979 | Ih | 350/188 |
| 4,511,220 | 4/1985 | Scully | 350/403 |
| 4,521,075 | 6/1985 | Obenschain et al. | 350/162.11 |
| 4,619,508 | 10/1986 | Shibuya et al. | 353/122 |
| 4,647,158 | 3/1987 | Yeadon | 350/358 |
| 4,744,615 | 5/1988 | Fan et al. | 350/96.1 |
| 4,851,978 | 7/1989 | Ichihira | 362/268 |
| 5,224,200 | 6/1993 | Rasmussen et al. | 385/146 |
| 5,233,460 | 8/1993 | Partio et al. | 359/247 |
| 5,274,494 | 12/1993 | Rafanelli et al. | 359/327 |
| 5,307,207 | 4/1994 | Ichihara | 359/622 |
| 5,313,479 | 5/1994 | Florence | 372/26 |
| 5,434,662 | 7/1995 | Rockwell et al. | 356/4.01 |
| 5,453,814 | 9/1995 | Aiyer | 355/70 |
| 5,621,529 | 4/1997 | Gordon et al. | 356/376 |
| 5,662,410 | 9/1997 | Suganuma | 362/268 |
| 5,729,374 | 3/1998 | Tiszauer et al. | 359/212 |
| 5,760,955 | 6/1998 | Goldenberg et al. | 359/456 |
| 5,832,006 | 11/1998 | Rice et al. | 372/3 |

OTHER PUBLICATIONS

Ambar et al., Relationship of speckle size to the effectiveness of speckle reduction in laser microscope images using rotating optical fiber, Optik, 74, No. 1, pp. 22–26, 1986.*

"Speckle Reduction in Coherent Information Processing", by T. Iwai and T. Asakura, Proceedings of the IEEE 84, 765–781 (1996.).

"Speckle Reduction In Laser Projection Systems by Diffractive Optical Elements", by L. Wang, T. Tschudi, T. Halldorsson, and P. R. Petursson, Applied Optics, 1770–1885 (1998).

"Speckle Reduction With Virtual Incoherent Laser Illumination Using a Modified Fiber Array", by B. Dingel, S. Kawata, and S. Minami, Optik 94, 132–136 (1993).

"Fringe Contrast Improvement in Speckle Photography by Means of Speckle Reduction Using Vibrating Optical Fiber", by H. Ambar, Y. Aoki, N. Takai, and T. Asakura, Optik 74, 60–64 (1986).

(List continued on next page.)

Primary Examiner—Cassandra Spyrou
Assistant Examiner—Craig Curtis
(74) Attorney, Agent, or Firm—Eugene Stephens & Associates; Thomas B. Ryan

(57) ABSTRACT

A speckle reduction system divides pulses of coherent radiation into successions of temporally separated and spatially aberrated pulselets. One or more beamsplitters divide the pulses into the successions of pulselets that are circulated through delay lines. Spatial aberrators located along the delay lines modify wavefront shapes of the pulselets. Together, the temporal separation and spatial aberration of the pulselets produce a succession of different speckle patterns that can be averaged together within the integration interval of a detector to reduce speckle contrast.

27 Claims, 3 Drawing Sheets

OTHER PUBLICATIONS

"Speckle Reduction in Pulsed–Laser Photographs", by D. Kohler, W.L. Seitz, T.R. Loree, and S.D. Gardner, Optics Communications 12, 24–28 (1994).

"Laser Speckle Reduction by Ultrasonic Modulation", by Y. Imai and Y. Ohtsuka, Optics Communications 27, 18–22 (1978).

"Reduction of Coherent Noise Using Various Artificial Incoherent Sources", by S. Jutamulia and T. Asakura, Optik 70, 52–57 (1985).

"Relationship of Speckle Size to the Effectiveness of Speckle Reduction in Laser Microscope Using Rotating Optical Fiber", by H. Ambar, and Y. Aoki, Optik 74, 22–26 (1986).

"Mechanism of Speckle Reduction in Laser–Microscope Images Using a Rotating Optical Fiber", by H. Ambar, Y. Aoki, N. Takai, and T. Asajkura, Applied Physics B 38, 71–78 (1985).

"Reducing Coherence in a Fifth–Harmonic YAG Source (213nm) for Use in Microlithography", by W. N. Partlo, and W. G. Oldham, J.Vac. Sci. Technology B 9, 3126–3131 (1991).

"Optical Coherence Modulation by Ultrasonic Waves. 2: Application to Speckle Reduction", by Y. Imai, M. Imai, and Y. Ohtsuka, Applied Optics 19, 3541–3544 (1980).

"An Adaptive Simulated Annealing Algorithm for Global Optimization Over Continuous Variables", by A. E.W. Jones, and G.W. Forbes, Journal of Global Optimization 6, 1–37 (1995).

* cited by examiner

LASER ILLUMINATION WITH SPECKLE REDUCTION

This application claims the benefit of U.S. Provisional Application No. 60/116,482, filed on Jan. 20, 1999, which Provisional application is incorporated by reference herein.

TECHNICAL FIELD

Optical information processing systems employing coherent radiation, particularly those used for optical imaging, experience a phenomena referred to as "speckle", which appears as random intensity patterns. Speckle reduction involves various techniques from source modifications to digital image processing.

BACKGROUND AND SUMMARY OF INVENTION

Lasers can be attractive sources for imaging systems for a variety of reasons. For example, they can be very bright sources. In addition, the highly temporally coherent (i.e., monochromatic) light that is typically emitted by lasers obviates the need to correct for chromatic aberrations. This is particularly advantageous at shorter wavelengths, such as those within the ultraviolet spectrum, where fewer choices of optical materials are available to correct for chromatic dispersions. However, laser sources also tend to be highly spatially coherent. Such highly coherent sources produce spatially random interference patterns or "speckle" as they are called, particularly accompanying reflections from or transmission through rough surfaces.

Speckle is a type of noise that obscures optical information presented in such forms as interference patterns or object images. Reported approaches to speckle reduction can be organized into five categories:

1. Average over many speckle patterns generated by a quasi-extended source, i.e., effectively reduce spatial coherence,
2. Average over many speckle patterns generated by a varying wavelength source, i.e., effectively reduce temporal coherence,
3. Average over many speckle patterns generated by spatially sampling different portions of an optical field,
4. Average over many speckles within a detector area or time-varying characteristics of the individual speckles, and
5. Digital image processing.

Our invention relates most closely to the first listed approach but can be used in combination with features of one or more of the other approaches to further enhance speckle reduction. For example, our system is effective with stationary components and an invariable nearly monochromatic source, but could possibly function even better with moving components or a varying wavelength source. Cost and added complexity are also considerations of such combinations.

The nearly monochromatic source contemplated for this invention is a pulsed source, such as an excimer or a solid state laser, that emits a series of pulses that are much shorter than an integration interval (response time) of a detector. In addition, the coherence length of the pulses from the nearly monochromatic source is preferably much shorter than a maximum pulse length corresponding to the detector's integration interval.

Within an optical processing system of this sort, we propose to accomplish speckle reduction by a combination of temporal division and spatial aberration. Each of the pulses is divided into a series of overlapping pulselets having coaxial wavefronts and the same length "$l_P$" as the individual pulses but staggered in time with respect to each other, preferably through increments greater than a coherence length "$\lambda_C$". The total length through which the pulselets are staggered increases a composite length "$L_T$" of the overlapping pulselets to at most fill the integration interval of the detector. In addition, each of the pulselets is spatially aberrated with respect to other of the pulselets that are spaced beyond the coherence length "$\lambda_C$". Accordingly, each pulselet temporarily produces a unique speckle pattern that combines with the different speckle patterns of all the other pulselets spaced beyond the coherence length "$\lambda_C$" to reduce by averaging the speckle effects produced by the nearly monochromatic light.

The improvement can be measured in terms of speckle contrast "C", which can be expressed mathematically as follows:

$$C = \frac{\sigma_I}{I_M}$$

where "$\sigma_I$" is a standard deviation of intensity across a speckle pattern and "$I_M$" is the mean intensity of the speckle pattern. The speckle pattern produced by a fully coherent source has unit contrast (C=1).

The speckle contrast "C" can also be related to a number "N" of independent speckle patterns of intensity "I" (i.e., random speckle patterns that combine incoherently) in accordance with the following relationship:

$$C = \frac{(I_1^2 + I_2^2 + I_3^2 + \ldots + I_N^2)^{\frac{1}{2}}}{I_1 + I_2 + I_3 + \ldots + I_N}$$

If all of the speckle patterns are produced by beams having the same energy, the equation for contrast "C" reduces to:

$$C = \frac{1}{\sqrt{N}}$$

Increasing the number "N" of independent speckle patterns reduces speckle contrast "C". However, due to the exponential nature of the relationship, reductions in speckle contrast "C" much below 1% occur quite slowly with increases in the value of "N". For example, only 25 independent speckle patterns are required to reduce speckle contrast to 20%, 10,000 independent speckle patterns are required to reduce speckle contrast to 1%, and 1,000,000 independent speckle patterns are required to reduce speckle contrast to 0.1%.

In practice, the number "N" of independent speckle patterns is generally limited by the composite length "$L_T$" of the overlapping pulselets required to fill the integration interval of the detector and by the coherence length "$\lambda_C$" of the monochromatic light as follows:

$$N = \frac{L_T}{\lambda_C}$$

Shorter composite lengths "$L_T$" reduce the number "N" of possible independent speckle patterns. Composite lengths "$L_T$" that extend beyond the integration interval of the detector waste illuminating power and do not contribute any more independent speckle patterns for averaging within the integration interval.

Temporal divisions of the pulses that are variously spatially aberrated with respect to each other within the coherence length "$\lambda_C$" can contribute to differences between the "N" number of independent speckle patterns. An intensity pattern generated by pulselets overlapping within the coherence length "$\lambda_C$" is found by summing their respective fields vectorially having regard to phase differences, prior to squaring these sums. While the resulting speckle pattern can be quite random, speckle contrasts "C" up to unity are still possible. However, an intensity pattern generated by pulselets overlapping beyond coherence length "$\lambda_C$" is found by squaring their individual fields and then summing these squares, which result in an overall averaging that yields a reduced speckle contrast.

DRAWINGS

DETAILED DESCRIPTION

Figure 1:
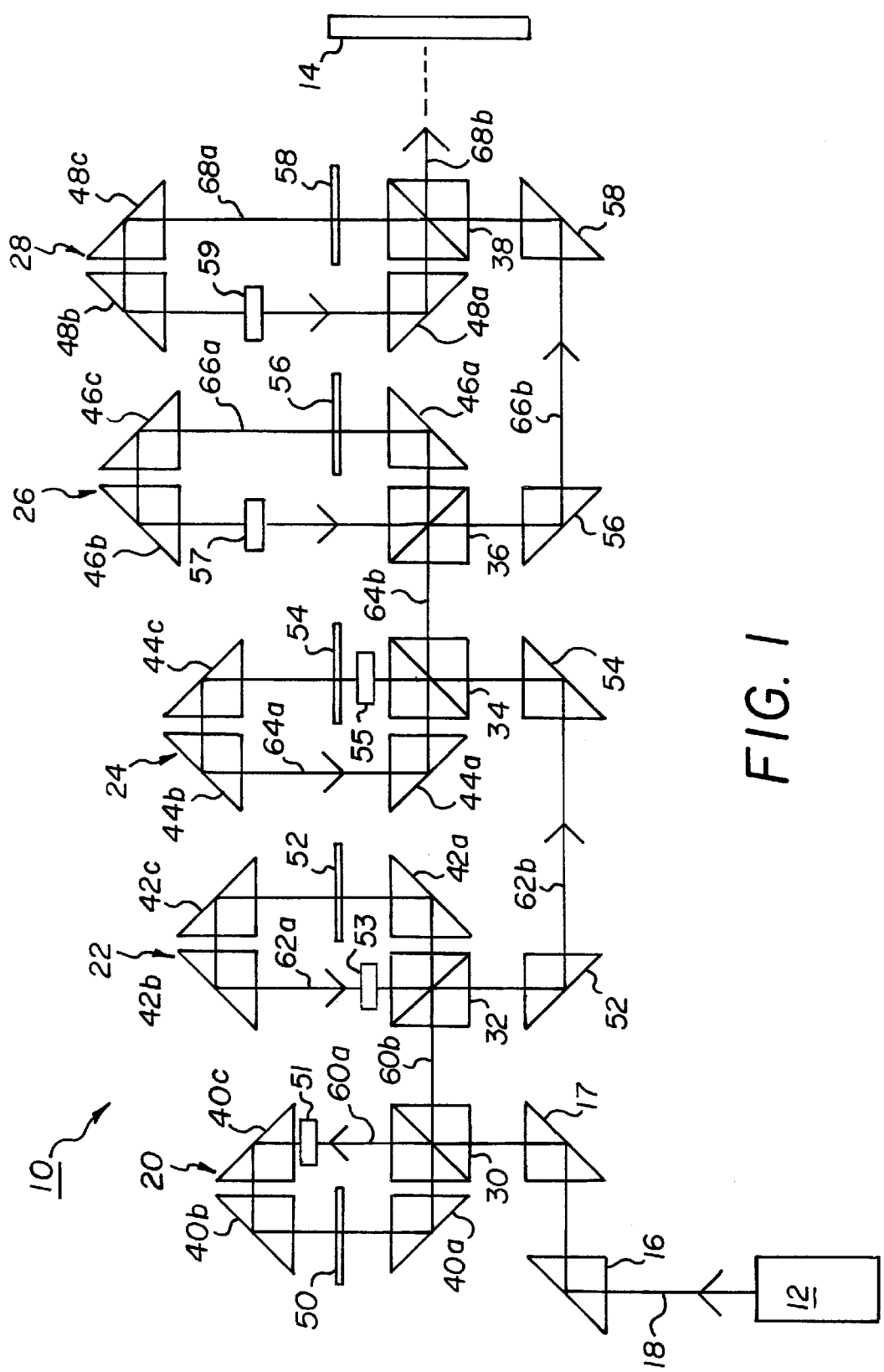
FIG. 1 is a diagram of an illuminator having a series of five delay lines, each in a circulating form for reducing speckle.

An illuminator 10 shown in FIG. 1 includes provisions for both temporally dividing and spatially aberrating individual pulses emitted from a pulsed laser source 12, including an excimer or a solid state laser such as a quadrupled Nd:YAG laser having a central wavelength "$\lambda_0$" at 266 nm (nanometers) and a bandwidth "$\Delta\lambda$" of 0.012 nm. The exemplary pulse length "$I_P$" is about 4 ns (nanoseconds) or 1.2 m (meters) in length.

A detector 14, which is the ultimate destination of the radiation emitted by the illuminator 10, measures incident radiation as a function of position for extracting information acquired by the light on route from the illuminator 10 to the detector 14. The incident radiation is converted into another form such as electrical values or photographic records. An integration interval (e.g., response time, refresh time, or exposure time) over which the radiation is collected for measuring intensity values is preferably longer than the pulse length and much longer that the coherent length "$\lambda_C$" of the pulsed radiation. An integration interval of 150 ns, for example, meets these criteria.

The coherent length "$\lambda_C$", which can be defined as follows:

$$\lambda_C = \frac{\lambda_0^2}{\Delta\lambda}$$

equals approximately 6 mm (millimeters) in the present example. Multiplying the integration interval of 150 ns by the speed of light gives a maximum exemplary composite length of 45 m, which is longer than pulse length "$I_P$" of 1.2 m and much longer than the coherent length "$\lambda_C$" of 6 mm.

Prisms 16 and 17 (or other optical routers including mirror series or waveguides) direct a pulsed beam 18 from the laser 12 into a first of a series of five delay lines 20, 22, 24, 26, and 28, which are accessed through a series of beamsplitter blocks 30, 32, 34, 36, and 38. Divided portions of the pulsed beam 18 (i.e., pulselets with coaxial wavefronts) are recirculated around the delay lines 20, 22, 24, 26, and 28 by series of prisms (or other optical routers including mirror series) 40, 42, 44, 46, and 48, which are subscripted "a–c" to distinguish the three prism members of each series. Along each delay line are spatial aberrators 50, 52, 54, 56, and 58, which can be formed as sculpted optics or other wavefront shapers that differentially affect optical path lengths between transverse sections of the pulselets. Connections between two pairs 22, 24 and 26, 28 of the delay lines are made by prisms 52, 54, 56, and 58.

Beamsplitter block 30 divides the pulsed beam 18 into pulselets 60a that recirculate around the delay line 20 and pulselets 60b that proceed to the next beamsplitter block 32, where a similar division of the pulselets 60b take place into pulselets 62a and 62b. Beamsplitter blocks 34, 36, and 38 divide incoming pulselets 62b, 64b, and 66b into further divided pulselets 64a and 64b, 66a and 66b, and 68a and 68b. Successive divisions of the recirculating pulselets 60a, 62a, 64a, 66a, and 68a take place at each of the beamsplitters 30, 32, 34, 36, and 38 such that the amplitudes of the recirculating pulselets 60a, 62a, 64a, 66a, and 68a progressively diminish after each recirculating cycle. Eventually, the entire pulsed beam 18 exits the illuminator 10 as a composite of all of the pulselets in positions that are temporally offset from one another. A composite length "$L_T$" of the temporally offset pulselets is preferably no greater than the integration interval of the detector 14.

The total number and individual optical path lengths of the delay lines 20, 22, 24, 26, and 28 as well as the beamsplitter ratios of transmission and reflection can be adjusted with respect to each other to optimize a number "N" of independent pulselets (among those with some significant amplitude) that are temporally offset from each other beyond the coherence length "$\lambda_C$". A mean delay at which one-half of the light energy is delayed less and one-half of the light energy is delayed more is equal to a sum of the individual single-round-trip delays through all of the delay lines 20, 22, 24, 26, and 28.

The aberrators 50, 52, 54, 56, and 58 within each of the delay lines 20, 22, 24, 26, and 28 reshape wavefronts of the pulselets 60a, 62a, 64a, 66a, and 68a during each recirculating cycle so that the independent pulselets produce different speckle patterns at the detector 14. Smooth (e.g., sinusoidal) variations in surfaces of the aberrators 50, 52, 54, 56, and 58 are preferred for this purpose to avoid unnecessary scatter. The sinusoidal variations preferably have periods less than the pulse diameter and amplitudes of a few microns or less (e.g., 0.5–2.0 microns).

The aberrators 50, 52, 54, 56, and 58 also preferably differ from each other to further randomize the spatial forms and resulting speckle patterns of the independent pulse portions. The difference can include both orientation and shape. The total aberration of the temporally offset pulse portions is preferably sufficient for purposes of illumination to eliminate need for a diffuser or other devices to increase the optical invariant of the beam. While the aberrators 50, 52, 54, 56, and 58 are preferably separate optics, similar aberrations could also be incorporated into any of the optics along the delay lines 20, 22, 24, 26, and 28, including the beamsplitter blocks 30, 32, 34, 36, and 38 or prisms 40, 42, 44, 46, and 48.

The table below includes data on five exemplary aberrators with sinusoidal peak-to-valley (P-V) amplitude variations ranging between 1 micron (μm) to 2 microns (μm). Periods of 0.5 mm and 2.0 mm are represented.

|  | Delay Line 20 | Delay Line 22 | Delay Line 24 | Delay Line 26 | Delay Line 28 |
| --- | --- | --- | --- | --- | --- |
| P-V Amplitude | 1.9 μm | 1.0 μm | 1.5 μm | 2.0 μm | 2.0 μm |
| Period | 2.0 mm | 0.5 mm | 0.5 mm | 0.5 mm | 0.5 mm |

| Delay Line 20 | Delay Line 22 | Delay Line 24 | Delay Line 26 | Delay Line 28 | Speckle Contrast |
| --- | --- | --- | --- | --- | --- |
| 222.19 mm | 267.57 mm | 282.57 mm | 291.40 mm | 320.00 mm | 6.72% |

By assuming that (a) no loss of light occurs along the delay lines 20, 22, 24, 26, and 28, (b) all of the beamsplitter blocks 30, 32, 34, 36, and 38 have equal reflectivity "R", and (c) every path through the delay lines yields an independent speckle pattern that adds incoherently, a theoretical limit of minimum speckle contrast "$C_{min}$" is given by the following equation:

$$C_{min} = \left(\frac{1 - 3R + 4R^2}{1 + R}\right)^{\frac{N}{2}}$$

A value of beamsplitter reflectivity "R" that results in the lowest level of speckle contrast is independent of the number of delay lines and is given as follows:

$$R_{opt} = \sqrt{2} - 1$$

Actual values for contrast "C" for a given number of delay lines "N" can be expected to be slightly greater than the minimum contrast "$C_{min}$" because the concept of coherence length "$L_{coh}$" is based on a coherence function of the source, such as a Gaussian function where the coherence length "$L_{coh}$" is the full-width-half-maximum (FWHM) of the Gaussian coherence function. Accounting for the finite coherence length, the speckle contrast "C" is more accurately represented by the following equation:

$$C = \frac{\left\{\sum_{j=1}^{N} I_j^2 + \sum_{j=1}^{N}\sum_{k=j+1}^{N} [2 I_j I_k \Lambda(d_{jk})]\right\}^{\frac{1}{2}}}{\sum_{j=1}^{N} I_j +}$$

where the term "$\Lambda(d_{jk})$" is the coherence function evaluated for a difference in delay length between two beams "j" and "k". If the source has a Gaussian coherence function and "Lcoh" is the full-width-half-maximum of the function, then the term "$\Lambda(d_{jk})$" can be written in the form:

$$\Lambda(d) = \exp[-\ln(2)(2d/L_{coh})^2]$$

A global optimizer, such as found in the Journal of Global Optimization 6, pages 1–34 (1995), by Andrew E. W. Jones and G. W. Forbes, entitled "An adaptive simulated annealing algorithm for global optimization over continuous variables," can be used to determine preferred lengths of the delay lines 20, 22, 24, 26, and 28 to accomplish speckle reduction goals. This publication is hereby incorporated by reference. Size and alignment considerations limit the length of the longest delay line 28. The shortest delay line 20 should still leave room for the aberrator 50. An experimental setup meeting these requirements is reproduced below:

Alignment of the delay line components is critical to the success of this method of speckle reduction. During alignment, the aberrating plates can be removed, and a 1.5 mm diameter aperture can be placed in the input beam 18. The output beam 68b can be focussed with a 500 mm focal length lens (not shown). Once the delay lines 20, 22, 24, 26, and 28 are aligned, the lens can be removed.

After roughly aligning the beams through the center of each of the beamsplitter blocks 30, 32, 34, 36, and 38, all but one of the delay lines 20, 22, 24, 26, and 28 can be blocked. When not all of the pulses are traveling in the same direction, a series of spots are arrayed along an arc at the focal plane of the lens. Each spot corresponds to light that has traversed the delay line a different number of times. The prisms, e.g., 40a, 40b, and 40c, are preferably adjustable about two rotational axes lying in the planes of their largest faces (the hypotenuse of right angle prisms). A horizontal axis lies in the plane of FIG. 1, and a vertical axis extends normal to this plane. One of the prisms, e.g., 40a, 40b, and 40c, of each of the delay lines 20, 22, 24, 26, and 28 can be separately adjusted to arrange all of the spots to overlie each other.

In addition to aligning all of the beams in the same direction, horizontal or vertical shifting in the parallel beams must be minimized. To monitor such shifting, the beams can be observed in planes at the exit of each of the beamsplitter blocks 30, 32, 34, 36, and 38. Again, all of the beams should overlap. Horizontal shifts in the plane of FIG. 1 can be reduced by translating the two remote prisms, e.g., 40b and 40c, in the direction of the light as it propagates through them. Vertical shifts normal to the plane of FIG. 1 can be reduced by rotating the same prisms 40b and 40c in opposite directions around their horizontal axes.

Auxiliary alignment optics (not shown) could also be incorporated into each of the delay lines 20, 22, 24, 26, and 28 to simplify assembly requirements. The various prisms and beamsplitter blocks, especially those whose separation is not required to extend optical path length, could be joined together to further simplify assembly requirements. Frequency shifters 51, 53, 55, 57, and 59 could also be added to the delay lines in place of or in addition to the spatial aberrators to 50, 52, 54, 56, and 58 to effectively shorten the coherence length "$\lambda_C$" and correspondingly increase the number "N" of different speckle patterns at the detector 14. The number of delay lines can be increased to further reduce speckle contrast or decreased to simplify manufacture and assembly.

Figure 2:
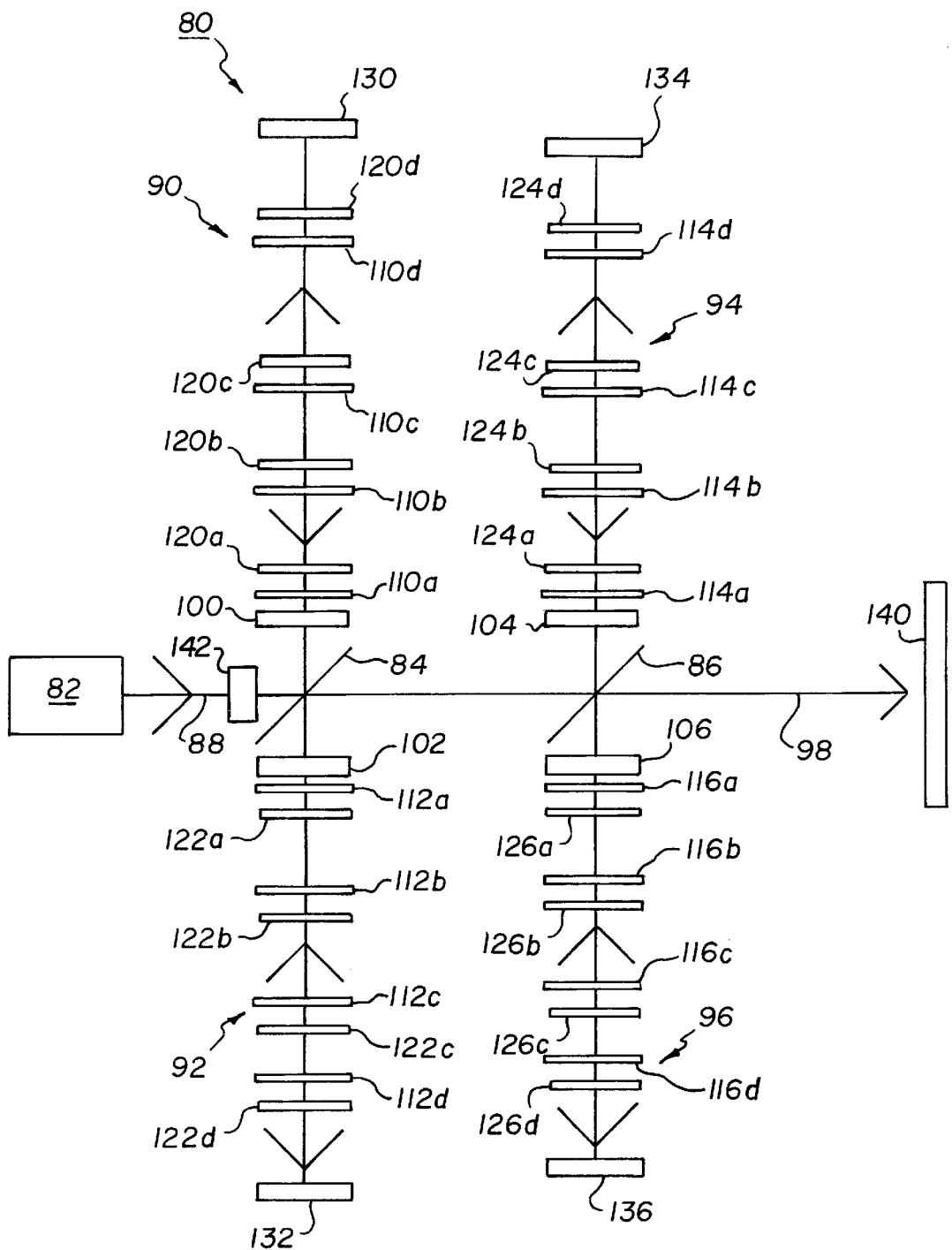
FIG. 2 is a diagram of another illuminator having four delay lines, each in a reciprocating form for reducing speckle.

An alternative illuminator 80 shown in FIG. 2 also includes provisions for both temporally dividing and spatially aberrating wavefronts of individual pulses emitted from a pulsed laser source 82. Beamsplitter plates 84 and 86 divide a pulsed beam 88 into temporally shifted portions (i.e., pulselets) that can traverse one or more of four linear delay lines 90, 92, 94, and 96 before recombining into an extended pulse beam 98 having a composite length "$L_T$".

Each of the linear delay lines 90, 92, 94, and 96 has a quarter wave plate 100, 102, 104, or 106 that prevents the pulselets from returning to the laser source 82. Four pairs (subscripted "a–d") of partial mirrors (e.g., beamsplitters)

and aberrating plates 110 and 120, 112 and 122, 114 and 124, and 116 and 126 are positioned along the linear delay lines 90, 92, 94, and 96, which terminate with full mirrors 130, 132, 134, and 136. The wave plate 100 directs pulselets emerging from delay line 90 through the beamsplitter 84 and into delay line 92 rather than back to the laser source 82. The wave plate 102 directs pulselets from the delay line 92 through the beamsplitter 84 toward the beamsplitter 86. The wave plates 104 and 106 perform similar functions first directing the pulselets from the third delay line 94 into the fourth delay line 96 and then from the fourth delay line 96 toward a detector 140.

The reciprocating paths of the linear delay lines 90, 92, 94, and 96 transmit the pulselets in two opposite directions through the aberrators 120, 122, 124, and 126. Accordingly, the magnitudes of the individual aberrations produced by the aberrators 120, 122, 124, and 126 can be only one-half of the magnitudes of the wavefront variations that would otherwise be required for single directions of travel along the delay lines 90, 92, 94, and 96. Variations between aberrators 120, 122, 124, and 126 within or between the linear delay lines 90, 92, 94, and 96 are possible to further randomize wave forms of the individual pulselets or combinations of the pulselets within the coherence length "$\lambda_C$".

The optical path lengths of the linear delay lines 90, 92, 94, and 96 and the spacing between the partial mirrors 110, 112, 114, and 116, as well as the spacing of the full mirrors 130, 132, 134, and 136 are adjusted to optimize a number "N" of independent pulselets separated by more than the coherence length "$\lambda_C$". The composite length "$L_T$" of the temporally spaced pulselets that make up the extended pulse beam 98 is preferably matched to the integration interval of the detector 140.

Although shown as straight lines, the linear delay lines 90, 92, 94, and 96 could also be arranged with equivalent optical pathways that bend or even wrap around to save space. Alignment optics or frequency shifters could also be added to provide advantages similar to those of the preceding embodiment.

More or fewer delay lines can be used to generate a desired number of independent pulselets separated beyond the coherence length. In fact, a single delay line may be sufficient for some purposes. The number of beam dividers and the form of aberrators paired with each of the beam dividers within the delay lines can also be adjusted to affect both the number and the spatial aberration of the independent pulselets. Each of the paired beam dividers and aberrators could also be formed by a common optic that performs both functions.

Figure 3:
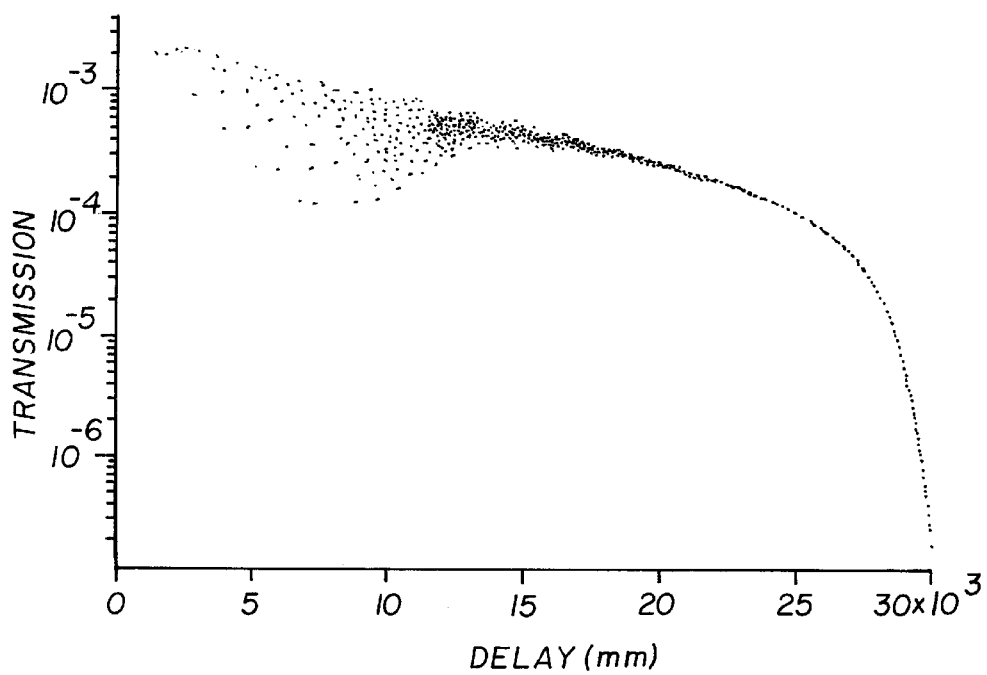
FIG. 3 is a graph plotting normalized transmission of pulselets over a domain of pulselet delay.
Figure 4:
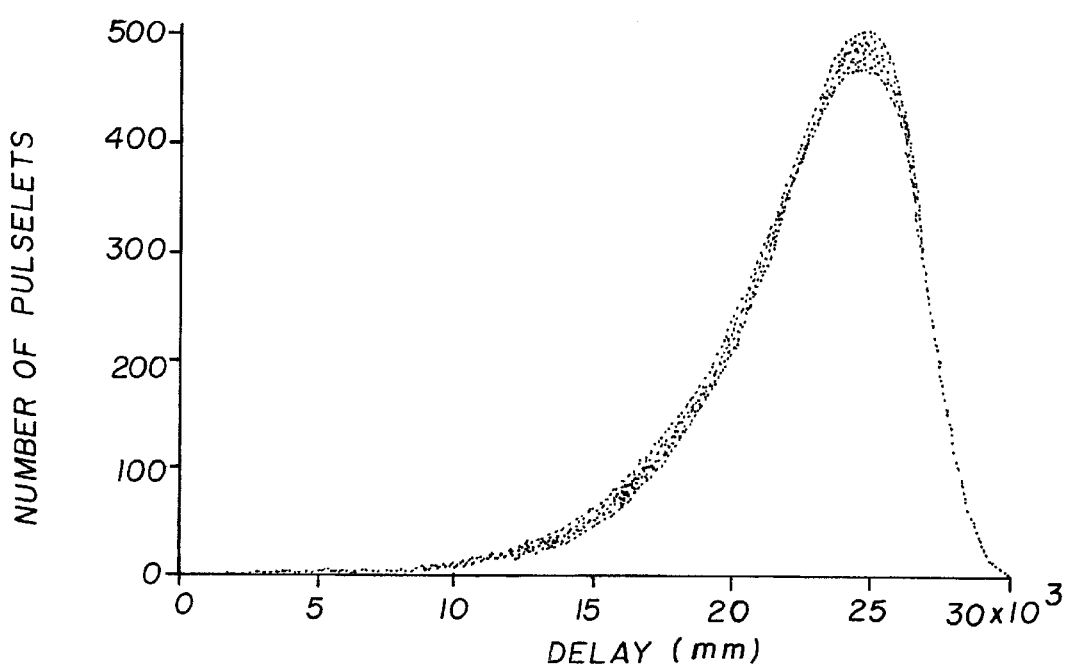
FIG. 4 is a graph plotting the number of pulselets over a similar domain of pulselet delay.

The graphs of FIGS. 3 and 4 illustrate normalized pulse transmissions and numbers of pulselets distributed over a common domain of delay produced by a combination of eight recirculating delay lines similar to FIG. 1. At shorter delays of less than 15 mm, the pulselets have relatively large but widely varying energy content. Few of the total number of pulselets are within this range. Most of the pulselets are distributed around a delay of approximately 24 mm. However, the energy content of the pulselets rapidly decays starting at slightly longer delays.

An even distribution of energy is preferred among the pulselet combinations that contribute independent speckle patterns. In fact, the contrast formula in terms of "N" speckle patterns makes this assumption. A lesser reduction in speckle contrast is expected if the average intensities of the independent speckle patterns vary too widely. The reflectivity of the beamsplitters can be adjusted to achieve a more even energy distribution. Furthermore, the reflectivity of the beamsplitters or partially reflective surfaces can be varied as a function of radial or lateral position in the pulselet fields to differentially reflect different cross-sectional areas of the pulselets.

A variety of other techniques can be used in combination with the delay and aberrating techniques to produce more independent pulselets within the limiting integration interval. For example, the pulselets can be shifted in polarization with respect to each other to effectively double the number of independent pulselets. A spectral disperser, 142 (see FIG. 2) such as a prism or diffractive optic, positioned in advance of the beamsplitter 84 could also be used in conjunction with our illuminator to spatially spread different wavelengths within the spectral bandwidth. The spacing variation is preferably within the envelope of the otherwise spatially aberrated beam emerging from the illuminator. Rotating beam prisms (such as Dove prisms) can be located in the delay lines to produce different spatial distributions of the wavelengths. This provides a greater degree of independence for overlapping pulselets with a common delay (i.e., within the coherence length).

We claim:

1. A speckle reduction system for a coherent optical source comprising:

a beamsplitter that divides a pulse of coherent radiation into a series of pulselets having substantially common cross-sectional areas with the pulse;

a delay line that separates the series of pulselets into a succession of temporally spaced pulselets;

an aberrator that spatially distinguishes wavefront shapes of the pulselets within the succession of pulselets; and the succession of aberrated pulselets being sufficiently temporally spaced and aberrated to produce a succession of different speckle patterns that accumulate incoherently over an interval for reducing speckle contrast.

2. The system of claim 1 in which the delay line returns pulselets to the beamsplitter so that some of the pulselets are further divided into additional temporally spaced pulselets.

3. The system of claim 1 in which the delay line temporally separates a plurality of the pulselets beyond a coherence length of the coherent radiation.

4. The system of claim 1 in which the beamsplitter is a first of a plurality of beamsplitters and the delay line is a first of a plurality of delay lines for further dividing the temporally spaced pulselets into additional temporally spaced pulselets.

5. The system of claim 4 in which the first beamsplitter divides the pulselets output from the first delay line between an input to the first delay line and an input to the second beamsplitter.

6. The system of claim 5 in which a second of the beamsplitters divides pulselets output from a second of the delay lines between an input to the second delay line and an input to a remaining part of the system.

7. The system of claim 6 in which the aberrator is a first of a plurality of aberrators, the first aberrator being located along the first delay line and a second of the aberrators being located along a second of the delay lines.

8. The system of claim 1 in which the delay line has a closed shape that recirculate further divisions of the pulselets in a common direction along the delay line.

9. The system of claim 1 in which the delay line has an open shape that reciprocates further divisions of the pulselets in opposite directions along the delay line.

10. The system of claim 9 further comprising additional beamsplitters located along the delay line to reciprocate the further divisions of the pulselets.

11. The system of claim 1 further comprising a frequency shifter positioned in the delay line to reduce an effective coherence length of the coherent radiation.

12. The system of claim 1 further comprising a spectral disperser positioned in advance of the beamsplitter for spatially separated different wavelengths of the coherent radiation.

13. The system of claim 1 further comprising a detector having an integration interval that approximately matches a combined length of the succession of aberrated pulses.

14. A method of reducing speckle contrast comprising the steps of:

dividing a pulse of coherent radiation into a series of pulselets having coaxial wavefronts;

temporally separating at least some of the pulselets beyond a coherence length of the radiation; and spatially aberrating the coaxial wavefronts of the temporally separated pulselets with respect to each other so that the temporally separated pulselets produce different speckle patterns.

15. The method of claim 14 in which the step of dividing includes redividing at least some of the pulselets, the step of temporally separating includes temporally separating the redivided pulselets, and the step of spatially aberrating includes spatially aberrating the redivided pulselets to produce more of the different speckle patterns.

16. The method of claim 14 in which the steps of dividing and temporally separating the pulselets include circulating progressive divisions of the pulselets along a continuous path.

17. The method of claim 16 in which the pulselets are circulated along the continuous path in a single direction.

18. The method of claim 14 in which the steps of dividing and temporally separating the pulselets include reciprocating progressive divisions of the pulselets along a linear path.

19. The method of claim 18 in which the pulselets are reciprocated along the linear path in two opposite directions.

20. The method of claim 14 in which the temporally separated pulselets extend through a length to approximately fill an integration interval of a detector that records the speckle patterns.

21. A speckle reduction system of an illuminator comprising:

a source of substantially coherent radiation having a limited coherence length;

a beam divider that divides a pulse of the coherent radiation into a series of pulselets that are directed along optical pathways distinguished in optical length by at least the coherence length of the radiation;

a plurality of spatial aberrators that are located along the optical pathways and that change wavefront shapes of the pulselets directed along the optical pathways; and a beam combiner that combines pulselets into a succession of overlapping pulses that are sufficiently temporally spaced and spatially aberrated to produce a corresponding succession of different speckle patterns.

22. The system of claim 21 in which the beam divider is a first of a plurality of beam dividers for further dividing the temporally spaced pulselets into additional temporally spaced pulselets.

23. The system of claim 21 in which the pulselets produced by the beam divider have substantially common cross-sectional areas with the pulse.

24. The system of claim 21 further comprising a delay line that returns pulselets to the beam divider so that some of the pulselets are further divided into additional temporally spaced pulselets.

25. The system of claim 21 in which at least some of the spatial aberrators located along the optical pathways differ from each other to further vary the succession of different speckle patterns.

26. The system of claim 25 in which the spatial aberrators differ in orientation.

27. The system of claim 25 in which the spatial aberrators differ in shape.

* * * * *